United States Patent
Hashimoto et al.

(10) Patent No.: US 6,443,055 B1
(45) Date of Patent: Sep. 3, 2002

(54) APPARATUS FOR PRODUCING FOOD PRODUCTS IN TWO LAYERS

(75) Inventors: Shigeru Hashimoto; Kazuhisa Yamatani, both of Utsunomiya (JP)

(73) Assignee: Rheon Automatic Machinery Co., Ltd., Utsunomiya (JP)

( * ) Notice: Subject to any disclaimer, the term of this patent is extended or adjusted under 35 U.S.C. 154(b) by 0 days.

(21) Appl. No.: 10/077,921

(22) Filed: Feb. 20, 2002

(30) Foreign Application Priority Data

Feb. 20, 2001 (JP) ........................................ 2001-043499

(51) Int. Cl.$^7$ ........................... A21C 3/10; A21C 9/00; A21C 9/06; A21C 11/00; A21D 8/00
(52) U.S. Cl. .................... 99/450.2; 99/450.1; 99/450.6; 99/450.7; 425/133.1; 425/131.1; 425/308
(58) Field of Search ............ 99/494, 516, 450.1–450.8; 425/133.1, 131.1, 308, 363, 132, 142, 287, 466; 426/516, 518, 503, 496, 512, 514, 517

(56) References Cited

U.S. PATENT DOCUMENTS

| | | | | |
|---|---|---|---|---|
| 4,517,785 A | * | 5/1985 | Masuda ...................... 99/450.6 |
| 4,528,900 A | * | 7/1985 | Simelunas .................. 99/450.7 |
| 4,692,109 A | * | 9/1987 | Hayashi et al. ............. 425/308 |
| 4,734,024 A | * | 3/1988 | Taashiro ..................... 99/450.2 |
| 4,806,087 A | * | 2/1989 | Hayashi ...................... 99/450.6 |
| 4,832,961 A | * | 5/1989 | Aoki .......................... 99/450.7 |
| 4,883,678 A | * | 11/1989 | Tashiro ................... 426/503 X |
| 4,949,630 A | * | 8/1990 | Knebl ......................... 99/450.2 |
| 5,098,273 A | * | 3/1992 | Tashiro ................. 425/133.1 X |
| 5,153,010 A | * | 10/1992 | Tashiro .................. 99/450.2 X |
| 5,156,869 A | * | 10/1992 | Otsuki ........................ 426/237 |
| 5,190,770 A | * | 3/1993 | Tashiro .................. 99/450.2 X |
| 5,882,711 A | * | 3/1999 | Onoguchi et al. ... 425/133.1 X |

FOREIGN PATENT DOCUMENTS

| | | |
|---|---|---|
| JP | 4-43032 | 10/1992 |
| JP | 10-0990025 | 4/1998 |

OTHER PUBLICATIONS

Catalog No. S–JUOO–008–3C, printed in Jul. 19994 by the applicant.

* cited by examiner

*Primary Examiner*—Timothy F. Simone
(74) *Attorney, Agent, or Firm*—Finnegan, Henderson, Farabow, Garrett & Dunner LLP

(57) ABSTRACT

An integrated unit for producing double-layered spherical products (23) in two rows on a belt conveyor (25) under it is disclosed. The length of the integrated unit is aligned with the traveling direction of the conveyor (25) in order to reduce the space needed on both sides of the conveyor (25). The integrated unit includes a filling feeder (15) and a casing feeder (17) for feeding a filling (5) and a casing (9) such that the feeders (15) and (17) are arranged opposite each other. A space between the feeders (15) and (17) of the integrated unit is provided with vane pumps (29A) and (29B) and a pair of double nozzles (13A) and (13B), which are positioned in the center of the integrated unit. The vane pumps (29A) and (29B) pump the corresponding materials (5) and (9) from the corresponding feeders (15) and (17) to the corresponding double nozzles (13A) and (13B). Each double nozzle extrudes the filling (5) and the casing (9) in a form of a double-layered elongated product. The integrated unit also includes a pair of cutting mechanisms (21) for cutting the elongated product into a plurality of double-layered spherical products (23), and for dropping them on the conveyor (25) in two rows.

9 Claims, 4 Drawing Sheets

APPARATUS FOR PRODUCING FOOD PRODUCTS IN TWO LAYERS

FIELD OF THE INVENTION

This invention generally relates to an apparatus for producing food products, and more particularly, to an apparatus for producing food products in two layers in which an outer material envelops an inner material.

BACKGROUND OF THE INVENTION

Well known in the prior art are apparatuses for producing food products in two layers, such as a Chinese bun, in which an inner food material ("filling"), e.g., a bean-paste, is enveloped by an outer food material ("casing"), e.g., a dough.

Such an apparatus is disclosed in Japanese Utility Model No. 4-43032, assigned to the Applicant. The apparatus includes a filling feeder for feeding a filling, a casing feeder for feeding a casing, a pair of dual screw conveyors, a pair of vane pumps, and a double nozzle. The screw conveyors separately operate such that each one receives the corresponding filling or casing from the corresponding feeder and transports it to the corresponding vane pump. The vane pump measures the transported material and continuously feeds it to the double nozzle for extruding an elongated and enveloped food product in which the outer material from the casing feeder envelops the inner material from the filling feeder. Each screw conveyor includes a rotatable screw or spiral that extends from under the corresponding feeder to an opening of the double nozzle such that the inner and outer food materials are propelled from the feeders to the double nozzle by the rotations of the screws.

Typically, the elongated product that is extruded from the double nozzle is then fed to a cutting mechanism that continuously cuts the elongated product to produce, e.g., rounded or slightly rounded, enveloped products, in each of which the casing envelops the filling. The rounded and enveloped products, which are fed from the cutting mechanism, then are set on a linear conveyor, e.g., a belt conveyor.

The yield of the rounded and enveloped products can be increased by using two or more double nozzles and corresponding cutting mechanisms, and corresponding pairs of screw conveyors, as shown in Japanese Patent Early-Publication No. 10-99025A, assigned to the applicant.

In the layout of a manufacturing line, each screw conveyor for the filling or the casing is located within an elongated housing, which is arranged such that the rotating shaft of the screw is orthogonal to the direction that the linear conveyor travels.

For example, if one wishes to feed two rows of the rounded enveloped products in parallel on the linear conveyor at the same time, two double nozzles, two dual vane pumps, and two dual cutting mechanisms are provided, above the linear conveyor, one on each side. Two pairs of elongated housings that each includes a screw conveyor are also provided.

To carry out this purpose, some examples of layouts of the linear conveyor and the two pairs of the elongated housings have been proposed.

In one layout, the linear conveyor and the two pairs of the elongated housings are arranged such that they form a cruciform, in which one pair of the elongated housings is located at the right side of the linear conveyor, while the opposed pair of the elongated housings is located at the left side. Unfortunately, this layout needs a wide space at each side of the linear conveyor, since the elongated housings are projected therefrom to form the cruciform. Further, food materials to be fed to the screw conveyors should be supplied from both sides of the linear conveyor and thus supply routes and the associated tasks can be complicated.

As an alternative layout, each of the elongated housings accommodates one screw conveyor, and the housings are arranged in parallel at one side of the linear conveyor. With this layout, the space at the other side of the linear conveyor can be reduced. Similarly, the supply routes and the associated tasks can be made simpler. However, because two double nozzles are arranged in parallel above the linear conveyor, one on the right and one on the left, the distance that the food materials to be transferred between the one pair of the screw conveyors and the double nozzle of the pair differs from that between the other pair of the screw conveyors and its double nozzle. As a result, the quantities of the elongated products extruded from the double nozzles may be unbalanced.

Considering the layouts of the rotating shaft of the screw of each screw conveyor and the rotating shaft of the corresponding vane pump, their rotating shafts may be offset and disposed at different levels, in parallel. Unfortunately, the height of any apparatus that employs such upper and lower offset shafts must be increased.

As an alternative design to avoid this problem, the rotating shaft of the screw of the screw conveyor and the rotating shaft of the corresponding vane pump may be disposed at the same level by connecting them by a bent piping. Although this alternative design can reduce the height of the apparatus, the direction of the flow of the food material from each screw should be turned toward the corresponding vane pump at the bent piping. Such a bent piping or turning passage may produce undesirable kneading of the food material due to the frictional resistances of the inner walls of it.

About the aspect of the components and the construction of the conventional apparatus, the number of vane pumps and the number of screw conveyors are in a one-to-one correspondence. Therefore, if a plurality of the double nozzles are used, the corresponding number of the vane pumps, and thus the corresponding number of the screw conveyors, should be employed. Consequently, the entire construction of the apparatus would be complicated. To simplify the construction of the apparatus, it is also proposed that a dual screw conveyor, which includes a pair of screws or spirals, can be used instead of each pair of the screw conveyors. However, this construction also involves the above problem of the undesirable kneading.

Accordingly, there is need in the art for a compact and simple apparatus that mass produces produces double-layered food products without any undesirable kneading.

In the conventional apparatuses described above, another problem also arises regarding the vane pumps. Each vane pump includes a radial arrangement of vanes situated at spaced circumferential points about the rotating shaft of the vane pump such that each space, which is defined by a pair of adjacent vanes, receives a mass of the food material. However, the spaces defined by each adjacent vane may often fill with unbalanced quantities of the food materials.

Accordingly, there is also a need in the art for an improvement that can smoothly feed a fixed quantity of food material into the corresponding double nozzle.

SUMMARY OF THE INVENTION

The present invention provides an apparatus for producing enveloped food products in which an outer food material envelops an inner food material. The apparatus includes a linear conveyor, having a given width and length, for conveying the enveloped food products to be set on the linear conveyor in multiple rows across the width of the linear conveyor, in the traveling direction, i.e., along the length of the linear conveyor. The apparatus also includes multiple units, located above the linear conveyor, each for producing enveloped food products corresponding to a separate row of each of the multiple rows of the enveloped food products on the linear conveyor. The multiple-units are arranged in parallel with each other such that their lengths are in the traveling direction of the linear conveyor.

Each unit of the multiple-units includes 1) a first feeding means, having an outlet for receiving the inner food material and for feeding out the inner food material from the outlet, 2) a second feeding means, having an outlet for receiving the outer food material and for feeding out the outer food material from the outlet of the second feeding means, wherein the second feeding means is opposed to the first feeding means, 3) a pair of vane pumps, one of which is provided for the inner food material and the other of which is provided for the outer food material, wherein each vane pump has an inlet near the corresponding outlet of the corresponding feeding means and an opposed vent and wherein each vane pump receives the corresponding food material from the corresponding outlet of the corresponding feeding means at the inlet of the vane pump, and continuously pumps out the received food material from the opposed outlet of the vane pump in a predetermined quantity, 4) enveloping means, located between the opposed outlets of the vane pumps, for causing the inner food material from the one vane pump to envelop the outer food material from the other vane pump so as to form an elongated product in which the outer-food material envelops the inner food materials and for extruding the elongated product from the adhering means, and 5) cutting means, located under the enveloping means, for cutting the elongated product so as to form a plurality of enveloped food products wherein in each product the outer food material envelops the inner food material, and for causing the cut products on the linear conveyor to drop such that the dropped and cut products form a predetermined row in the multiple rows of the enveloped food products on the linear conveyor.

Preferably, two or more units may form an integrated unit. In the preferred embodiments, each feeding means has a rotating screw or spiral for propelling the corresponding food material to the outlet of the feeding means. The rotating shaft of the rotating screw may be provided horizontally. In this case, the rotating screw and the pump can be located at the same level. Alternatively, the rotating shaft of the rotating screw may be provided vertically.

In the preferred embodiment, each vane pump has a vertical rotating shaft.

Preferably, the enveloping means and the cutting means are located at the longitudinal center of the unit. In this case, the multiple units may be arranged such that the points where the enveloped food products drop on the linear conveyor from the cutting means are substantially aligned on a straight line across the width of the linear conveyor.

BRIEF DESCRIPTION OF THE DRAWINGS

The foregoing and other objects, features, and advantages of the present invention will be further understood from the following detailed description, of the preferred embodiments and from the accompanying drawings in which.

DETAILED DESCRIPTION OF THE PREFERRED EMBODIMENTS

Figure 1:
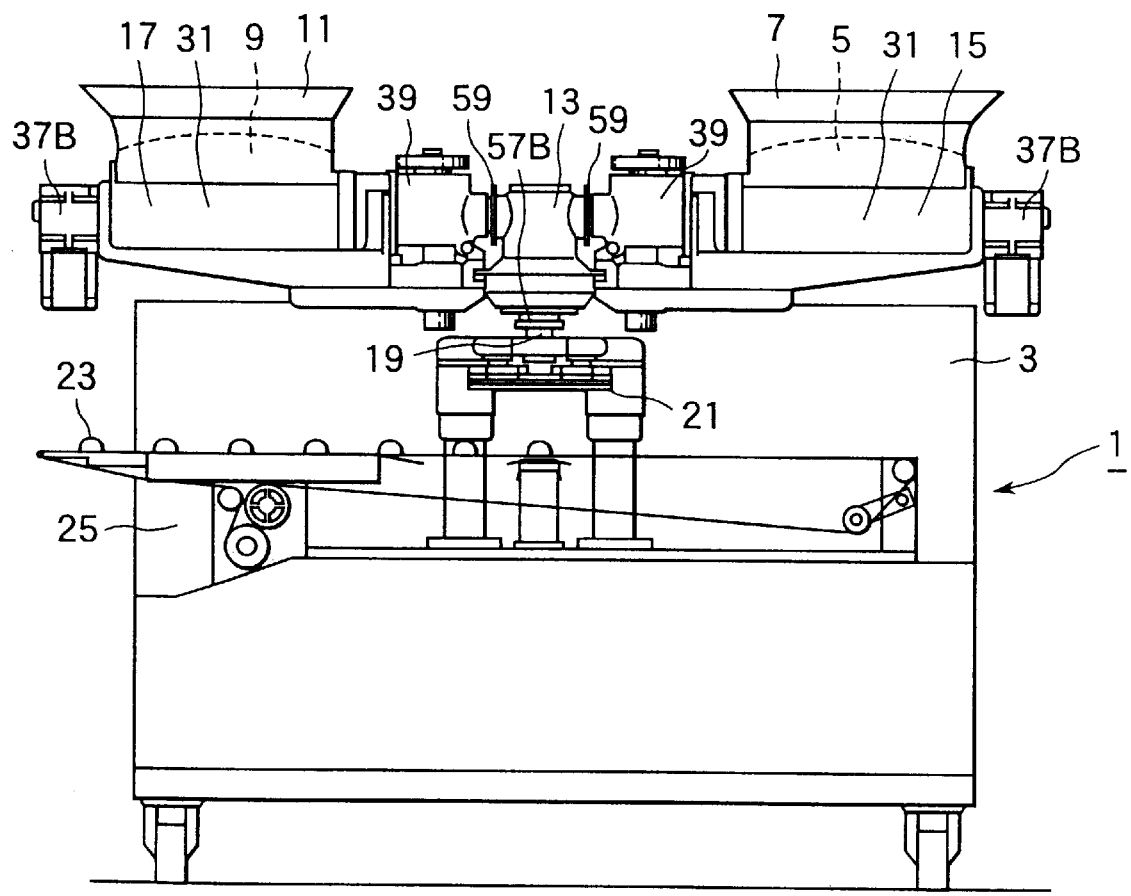
FIG. 1 is a side elevational view of an apparatus embodying the present invention.
Figure 2:
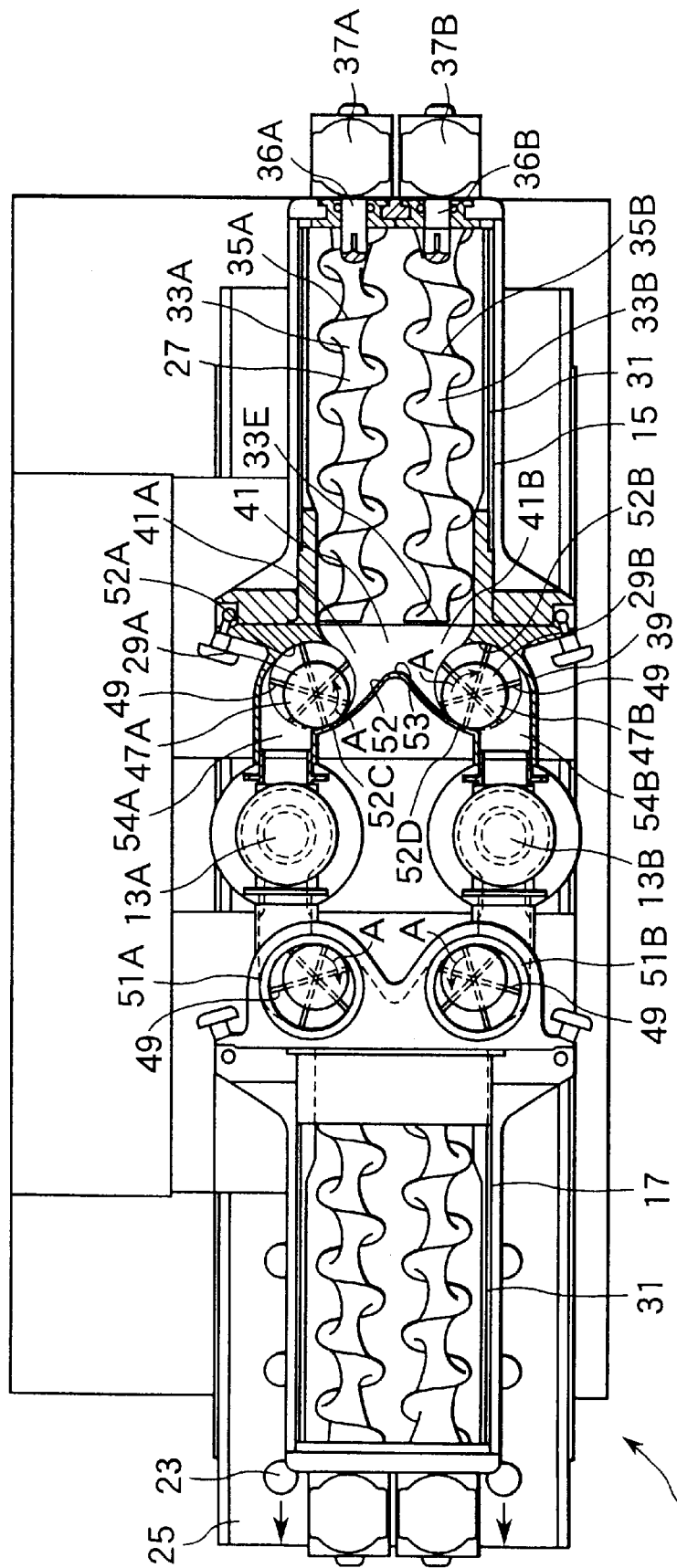
FIG. 2 is a plan view of the apparatus shown in FIG. 1.
Figure 3:
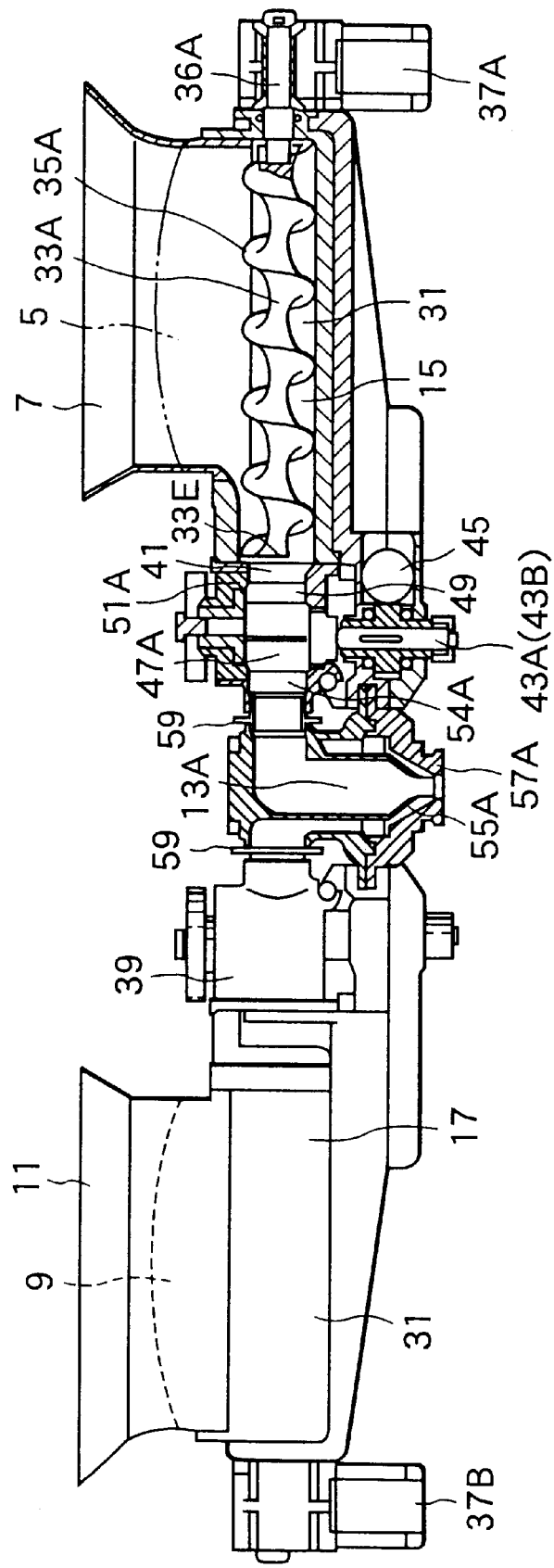
FIG. 3 is a side elevational view, partly in cross section, of the upper portion of the apparatus shown in FIG. 1.

Turning now to the drawings, wherein the same or like components are designated by like numbers, FIGS. 1, 2, and 3 show one preferred embodiment of an apparatus 1 for continuously producing the double-layered products of this invention.

Before a cutting process starts, this double-layered product is a substantially elongated or bar-shaped product that may have a cross-sectional area either substantially square or substantially circular or semi-circular. This product consists of two layers: an outer food material (referred to as a "casing") and an inner food material (referred to as a "filling") enveloped by the casing. The final product produced by the apparatus 1 is made from the elongated product by means of the cutting process. The final product is substantially rounded, or slightly rounded, and double-layered, but can take various forms, such as dumplings, or other rice-based products. In the present invention the casing is a food material, such as rice dough, wheat dough, cheese, meat, a processed marine product, any paste food or the like, while the filling is a food material, such as bean paste, jam, cheese, meat, a processed marine product, any paste food, or the like.

It should be understood that in the specification the term "final product" does not always mean an end product ready for consumer use, but may merely mean an enveloped food product that has a substantially spherical, hemispheric, or like form. Those skilled in the art will understand that any cooking process, for example, heating, steaming, and other processes, can be applied to the product produced by the apparatus 1.

In FIG. 1, the apparatus 1 includes a frame 3, whose upper portion is provided with a filling hopper 7 for supplying the filling 5, and a casing hopper 11 for supplying the casing 9.

As is more clearly shown in FIG. 2, the apparatus 1 includes an integrated unit that has two units for producing the final products 23 in multiple rows, e.g., two rows in the embodiment, on an appropriate linear conveyor, e.g., a belt conveyor 25. Mounted under the first hopper 7 is a filling feeder 15 for receiving the filling therefrom and for feeding it to a pair of double nozzles 13A and 13B on the frame 3. Similarly, mounted under the casing hopper 11 is a casing feeder 17 for receiving the casing therefrom and for feeding it to the pair of the double nozzles 13A and 13B. The filling feeder 15 and the casing feeder 17 are symmetrically arranged in respect to the vertical center axis (not shown) of the apparatus 1.

To carry out production in two rows, the double nozzles 13A and 13B are provided as two rows between the feeders 15 and 17, for downwardly extruding the filling fed from the filling feeder 15 and the casing fed from the casing feeder 17 and adhering them in the form of an elongated product, in which the casing envelops the filling.

Similarly, to carry out the production in two rows, vertically movable cutting mechanisms 21 (only one is shown in FIG. 1) are also provided as two rows in the frame 3 such that each cutting mechanism 21 is positioned below the corresponding double nozzles 13A or 13B. Each cutting mechanism 21 receives and cuts the elongated product that is extruded from the corresponding double nozzles 13A or 13B so as to produce rounded, enveloped products. Each cutting mechanism 21 is well known in the art and can be, but is not limited to, that disclosed in, e.g., U.S. Pat. No. 5,882,711, assigned to the assignee of this application.

In the frame 3, the belt conveyor 25 is located below the cutting mechanisms 21 to receive the enveloped products 25 to be fed and to convey them to the following station. Although the linear conveyor or the belt conveyor 25 is well known in the art, it is not limited to that illustrated in the figures.

Turning to FIG. 2, the filling feeder 15 and the casing feeder 17 will now be described.

Because both feeders 15 and 17 have the same arrangement, the following representative descriptions for the arrangement and the functions of the components of the filling feeder 15 are adapted to those of the same components, which are designated by like numbers, of the casing feeder 17, with which they are interchangeable.

The filling feeder 15 includes a dual screw conveyor 27 for receiving the filling fed from the filling hopper 7, and a pair of vane pumps 29A and 29B, each of which is a measuring pump for continuously propelling the fixed quantity of the filling fed from the screw conveyor 27 to the corresponding double nozzle 13A or 13B. To carry out the producing in two rows, vane pumps 29A and 29B are also provided in two rows.

The dual screw conveyor 27 includes a screw housing 31, whose inner bottom portion forms a pair of grooves, each having a semi-circular cross-section, and a pair of horizontal screws 33A and 33B located in the grooves, within the housing 31. The grooves and the horizontal screws 33A and 33B therein are elongated and are substantially parallel with the traveling direction of the linear conveyor 25.

The screws 33A and 33B have spiral wings 35A and 35B wound about horizontal rotating shafts 36A and 36B, respectively, thereof. The spiral wing 35A is inversely wound in the same pitch as that of the spiral wing 35B. The pair of screws 33A and 33B can be synchronized to be rotated in the opposite directions. According to the characteristics of the food material to be fed, the spiral wings 35A and 35B may be in phase, as shown in FIG. 2. Alternatively, they may be arranged in opposite phases and close to each other.

To synchronously rotate the screws 33A and 33B in opposite directions, in the embodiment, the rotating shafts 36A and 36B that can be engaged and disengaged with the proximal ends of the screws 33A and 33B are direct and driving and coupled with appropriate control motors, e.g., servo motors 37A and 37B.

Alternatively, but not shown, a pair of gears, each having the same radius, mesh with each other, and may be provided on rotating shafts and in turn drivingly coupled with appropriate control motors, e.g., servomotors, via an appropriate transmission mechanism that may include, e.g., a gear train, a chain and a belt, etc.

Although the pair of screws 33A and 33B are provided to carry out the production in two rows, instead of them, one screw that has a comparatively large radius may be employed such that it has the same function as the pair of screws 33A and 33B.

As in FIG. 2, when the servomotors 37A and 37B are rotated in an appropriate manner to synchronously rotate the screws 33A and 33B in the opposite directions, the screws 33A and 33B propel the food material to be fed into the corresponding vane pumps 29A and 29B. As noted above, the phase of the spiral wings 35A and 35B may be preferably adjusted in accord with the characteristics of the food material to be preferably fed.

The vane pumps 29A and 29B include vertical rotating shafts 43A and 43B, respectively, and a set of radially movable vanes 49 extending radially therefrom. The set of radially movable vanes 49 forms a radial arrangement of vanes 49 situated at spaced circumferential points around the rotating shafts 43A and 43B. The pair of vane pumps 29A and 29B is accommodated in a pump housing 39 that communicates with the open end of the screw housing 31. The pump housing 39 includes tapered inner walls to define a tapered passageway 41, which has a diminishing conical taper from the side adjacent the screw housing 31 to the opposed side, and a pair of recesses that communicates with the tapered passageway 41 via openings 41A and 41B at the tapered inner walls. The recesses receive the corresponding vane pumps 29A and 29B such that the vertical rotating shafts 43A and 43B are rotatably arranged in a symmetrical relation about the narrow side of the tapered passageway 41.

To synchronously rotate the shafts 43A and 43B in opposite directions, in the embodiment they are drivingly coupled by an appropriate transmission mechanism 45, e.g., a belt and a gear train, etc. Both the vertical rotating shafts 43A and 43B are then drivingly coupled with an appropriate control motor (not shown). Alternatively, the shafts 43A and 43B may be drivingly coupled with individual motors to separately control the rotations of them.

The vertical rotating shafts 43A and 43B are integrated with vertical rotating cylinders 47A and 47B, respectively, which are located within the pump housing 39 at the same level as the screws 33A and 33B. The inner walls of both rotating cylinders 47A and 47B are provided with a plurality of slits that extend the length of the cylinder to receive the plurality of vanes 49A and 49B respectively in such a manner that. the vanes can be moved in radially and horizontally. The pump housing 39 is provided with cams 51A and 51B having appropriate profiles to move the vanes radially with the rotations of the cylinders 47A and 47B. Further, a divided wall 53 is projected from the inner wall 52 of the pump housing 39 at the inner part of the tapered passageway 41 where the inner wall 52 contacts the rotating cylinders 47A, 47B.

At the opposite sides of the tapered passageway 41, the rotating cylinders 47A and 47B have outlets 54A and 54B, which communicate with the double nozzles 13A and 13B. This arrangement reduces the length of each passage from each vane pump 29 to the corresponding double nozzle 13A or 13B. Thus, when the cylinders 47A and 47B rotate in the direction denoted by an arrow A, the food material fed by the dual screw conveyors 27 is propelled into the common tapered passageway 41 and divided equally into two portions by the divided wall 53. The divided portions of the food materials are then gradually moved from the distal ends of the vanes 49A and 49B to the rotating cylinders 47A and 47B. Thus, each space that is defined by the adjacent vanes 49A or 49B within the rotating cylinder 47A or 47B is filled with a half portion of the food material. The food materials in the rotating cylinders 47A and 47B are then vented out from the outlets 54A and 54B in preset quantities and supplied to the double nozzles 13A and 13B.

With the above arrangement, the capacity of both vane pumps 29A and 29B can be readily increased by increasing the length of each of the cylinders 47A and 47B, respectively, and the width of each vane 49. Namely, because the capacity of each vane pump 29 can be varied without a change in the radial dimension of either vane 49A or 49B, the length of the passage in which the food material is moved in the vane pump is maintained constant, while the capacity of the vane pump is varied.

When the rotating shafts 43A and 43B of the vane pumps 29 rotate to directly fill the spaces defined by vanes with the food materials fed by the dual screw conveyors 27A and 27B, undesirable kneading of the food materials should be avoided. To carry out this purpose, the lengths of sections 52C and 52D, where the rotating cylinders 47A and 47B contact the inner walls 52A and 52B, should be in a pitch between adjacent vanes 49 so as to widen the inlets 41A and 41B of the tapered passageway 41, where the food materials are supplied between the vanes 49.

Preferably, the control motor 37 of the dual screw conveyor 27 and the control motors of the vane pumps 29A and 29B are independently controlled by an appropriate controller, e.g., a computer, to control their rotation rates such that the spaces defined by the adjacent vanes 49 within the vane pumps 29 can be sufficiently filled with the food materials. Thus, the food materials may be continuously fed from the vane pumps 29A and 29B in fixed quantities. With such a control, the ratios of the number of rotations of the control motor 37 of the dual screw conveyor 27 to those of the control motors of the vane pumps 29A and 29B can be variably controlled, and the rotation of each control motor can be also controlled. Consequently, the measuring chambers of the vane pumps 29 can be evenly filled with the food materials without applying high pressures to the food materials at the tapered passageways 41. Thus the amount produced can be adjusted.

Each double nozzle 13A (13B) includes an inner nozzle 55A (55B) for venting out the filling 5 and an outer nozzle 57A (57B) for venting out the casing 9, wherein the outer nozzle surrounds the inner nozzle. Ducts 59 connect the inner nozzle 55A (55B) and the vane pump 29A (29B) for the filling, and connect the outer nozzle 57A (57B) and the vane pump 29A (29B) for the casing. The ducts 59 are made greater in radius and shorter in length than conventional ducts, so as to avoid that any damage, e. g., an undesirable kneading, from occurring to the food materials passing therein.

Cleaning and maintenance may be readily carried out on the dual screw conveyors 27A and 27B, the vane pumps 29A and 29B, and the double nozzles 13A and 13B, since they can be disassembled and reassembled based on the construction described above.

Below the operation of the apparatus will be described. The filling hopper 7 and the casing hopper 11 are filed with the filling 5 and the casing 9. The dual screw conveyors for the filling feeder 15 and the casing feeder 17 are then smoothly rotated and thus the filling 5 in the hopper 7 and the casing 9 in the hopper 11 are horizontally propelled into the corresponding vane pumps. Each fixed quantity of the filling 5 and the casing 9 is then passed through the corresponding tapered passageway 41 from the traveling end 33E of the corresponding screw, without undesirable kneading. The dividing wall 53 within the pump housing 39 then divides the fixed quantity of the food material 9 that comes from the tapered passageway. The divided food material is then introduced into the corresponding vane pump 29A or 29B, both having the wide opening, and thus directly introduced into the spaces defined by the adjacent vanes 49.

In this operation, because the tapered passageway 41 has an inner diameter that gradually increases from the inlet to the inner portion of it and the wider outlets 41A and 41B each communicates with vanes 49, the food materials within it are smoothly guided into the vanes. Thus, the vane pumps 29A and 29B can continuously feed the food materials in constantly fixed quantities into the double nozzles 13A and 13B, since their inner spaces defined by the adjacent vanes can be sufficiently filled with the food materials.

At the double nozzles 13A and 13B, the casing 9, which is extruded from the vane pumps 29A and 29B of the casing feeder 17, has an elongated configuration, while the filling 5, which is extruded from the vane pumps 29A and 29B of the filling feeder 15, also has an elongated configuration and is surrounded by the elongated casing 9.

The double-layered elongated products that are extruded from the double nozzles 13A and 13B then pass to the corresponding cutting mechanisms 21. Each cutting mechanism 21 cuts the corresponding elongated product to form spherical or slightly rounded products 23, in which the filling 5 is completely or partly enveloped by the casing 9.

The cut products (final products) 23 drop onto the linear conveyor 25 in two rows and are conveyed to the following section.

As noted above, the screws 33A and 33B of the dual screw conveyors 27A and 27B, the vane pumps 29A and 29B, and the double nozzles 13A and 13B are located at the same level. With this arrangement, the uniform length of each radius of each vane 49 of the vane pumps 29A and 29B can be maintained, even if the width of each vane 49 is increased in order to increase the storage capacities of the vane pumps 29A and 29B. Further, the depth of the radius of each measurement chamber of the vane pumps 29A and 29B may be changed quite a little. Therefore, the measurement chambers of the vane pumps 29A and 29B can be rapidly filled with the food materials without any lack of any chambers not being filled.

Figure 4:
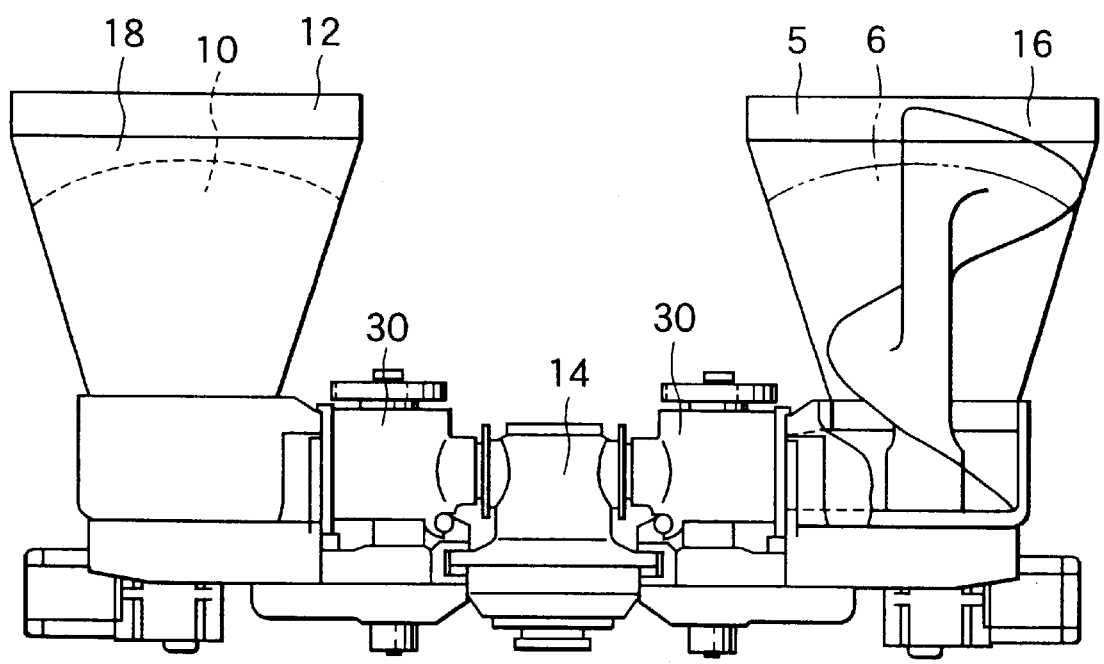
FIG. 4 is a diagrammatic side elevational view, partly in cross section, of the upper portion of the alternative apparatus of the invention.

In the above embodiment, the screws 33A and 33B of the screw feeders 27 are horizontally located at the same level as that of the vane pumps 29A and 29B. Alternatively, the apparatus of this invention can also be used in conjunction with vertical screws, as shown in FIG. 4. In FIG. 4, which shows an alternative unit of the apparatus of this invention, the unit employs a vertical filling feeder 16 and a vertical casing feeder 18 instead of the combination of the horizontal filling feeder 15 and its .filing hopper 7 and the combination of the horizontal casing feeder 1 7 and its casing hopper 11 of the first embodiment of FIGS. 1–3, respectively. The vertical filling feeder 16 and the vertical casing feeder 18 are funnel-shaped hoppers. Each has therein a vertical screw 34 coaxial with it (FIG. 4 shows only one screw 34 in the filling feeder 16). These vertical feeders 16 and 18 are provided such that their outlets are located adjacent to the passageway 41(not shown in FIG. 4) in the first embodiment. The rotations of the vertical screws 34 of the vertical filling feeder 16 and the casing feeder 18 smoothly and downwardly propel the food materials into vane pumps 30. The filling and the casing are then pumped by the vane pumps 30 into a corresponding double nozzle 14, which is similar to the double nozzles 13A and 13B of the first embodiment, and then processed by the cutting mechanisms and the linear conveyor (neither shown in FIG. 4) in the same manner as in the first embodiment. Although FIG. 4, as a matter of convenience, shows only one unit for extruding a double-layered, elongated product, two or more units are provided in parallel to each other, such that their widths are across the direction of traveling of the linear conveyor.

Those skilled in the art will understand that various modifications and variations may be made to the present invention without departing from its scope and sprit as defined by the appended claims. For example, while the axes of rotation of the vane pumps in the above embodiments have been shown as vertical axes, it would be obvious to those skilled in the art that they are not so limited, but they may be designed so that they are provided horizontally or obliquely.

We claim:

1. An apparatus for producing enveloped food products in which an outer food material envelops an inner food material, said apparatus comprising:
   a linear conveyor, having a given width and length, for conveying the enveloped food products, which are set on the linear conveyor in multiple rows across the width of the linear conveyor in the traveling direction along the length of the linear conveyor; and
   multiple units, located above the linear conveyor, each for producing the enveloped food products to be set on a separate row of the multiple rows of the enveloped food products on the linear conveyor, wherein multiple units are arranged in parallel such that their lengths are located along the traveling direction of the linear conveyor, each unit including:
   i) a first feeding means, having an outlet for receiving the inner food material and for feeding the inner food material from the outlet;
   ii) a second feeding means, having an outlet for receiving the outer food material and for feeding the outer food material to the outlet of the second feeding means, wherein the second feeding means is opposite the first feeding means;
   iii) a pair of vane pumps, one of which is provided for the inner food material and the other of which is provided for the outer food material, wherein each vane pump has an inlet near the corresponding outlet of the corresponding feeding means and has an opposite outlet and wherein each vane pump receives the corresponding food material from the outlet of the first feeding means at the inlet of the vane pump, and wherein each pump continuously pumps out the received food material from the opposite outlet of the vane pump in a predetermined quantity;
   iv) enveloping means, located between the opposite outlets of the vane pumps, for causing the inner food material from one vane pump to envelop the outer food material from the other vane pump so as to form an elongated product in which the outer food material envelops the inner food material and for extruding the elongated product from the enveloping means; and
   v) cutting means, located under the enveloping means, for cutting the elongated products so as to form a plurality of enveloped food products wherein in each product the outer food material envelops the inner food material, and for dropping the cut products on the linear conveyor such that the dropped and cut products form a predetermined row of multiple rows of the enveloped food products on the linear conveyor.

2. The apparatus of claim 1, wherein two or more units form an integrated unit.

3. The apparatus of claim 1, wherein each feeding means has a rotating screw or spiral for propelling the corresponding food material to the outlet of the feeding means.

4. The apparatus of claim 3, wherein the rotating shaft of the rotating screw is provided horizontally.

5. The apparatus of claim 4, wherein the rotating screw and the vane pump are located at the same level.

6. The apparatus of claim 3, wherein the rotating shaft of the rotating screw is provided vertically.

7. The apparatus of claim 1, wherein each vane pump has a vertical rotating shaft.

8. The apparatus of claim 1, wherein the enveloping means and the cutting means are located at the longitudinal center of the unit.

9. The apparatus of claim 7, wherein the multiple units are arranged such that the points where the enveloped food products drop on the linear conveyor from the cutting means are substantially aligned on a straight line across the width of the linear conveyor.

* * * * *